(12) United States Patent
Iyer et al.

(10) Patent No.: US 7,539,004 B2
(45) Date of Patent: May 26, 2009

(54) FILTERED FEEDTHROUGH ASSEMBLY AND METHOD OF MANUFACTURE

(75) Inventors: Rajesh V. Iyer, Eden Prairie, MN (US); John P. Tardiff, Corcoran, MN (US); Michael G. Marinkov, Woodbury, MN (US); Susan A. Tettemer, Fridley, MN (US)

(73) Assignee: Medtronic, Inc., Minneapolis, MN (US)

( * ) Notice: Subject to any disclaimer, the term of this patent is extended or adjusted under 35 U.S.C. 154(b) by 485 days.

(21) Appl. No.: 11/321,382

(22) Filed: Dec. 29, 2005

(65) Prior Publication Data
US 2007/0279833 A1    Dec. 6, 2007

(51) Int. Cl.
*H01G 4/35* (2006.01)
(52) U.S. Cl. .......................................... 361/302; 607/37
(58) Field of Classification Search ................. 361/302; 333/182; 607/1, 36–38
See application file for complete search history.

(56) References Cited

U.S. PATENT DOCUMENTS

| | | | |
|---|---|---|---|
| 4,424,551 A | 1/1984 | Stevenson et al. | |
| 5,333,095 A | 7/1994 | Stevenson et al. | |
| 5,406,444 A | 4/1995 | Selfried et al. | |
| 5,650,759 A | 7/1997 | Hittman et al. | |
| 6,453,551 B1 | 9/2002 | Nordquist et al. | |
| 6,519,133 B1 | 2/2003 | Eck et al. | |
| 6,643,903 B2 * | 11/2003 | Stevenson et al. | 29/25.42 |
| 6,660,116 B2 | 12/2003 | Wolf et al. | |
| 6,778,040 B2 | 8/2004 | Kim | |
| 2005/0023665 A1 * | 2/2005 | Ledwidge | 257/679 |

* cited by examiner

*Primary Examiner*—Scott M Getzow
(74) *Attorney, Agent, or Firm*—Stephen W. Bauer; Scott A. Bardell (57) ABSTRACT

A method for coupling a capacitor to a feedthrough assembly that includes a ferrule and a terminal pin therethrough is provided. The method comprises dispensing an epoxy onto an outer surface of the feedthrough assembly. A capacitor, which has an opening therethrough for receiving the terminal pin and cooperates therewith to form a cavity, is placed over the ferrule to contact the epoxy. A weight is placed on the capacitor to position it with respect to the terminal pin, and the epoxy is cured.

10 Claims, 8 Drawing Sheets

FILTERED FEEDTHROUGH ASSEMBLY AND METHOD OF MANUFACTURE

TECHNICAL FIELD

This invention relates generally to implantable medical devices and, more particularly, to a filtered feedthrough assembly for use with an implantable medical device.

BACKGROUND OF THE INVENTION

Cardiac pacemakers and other such implantable medical devices (e.g., cochlear implants, defibrillators, neurostimulators, active drug pumps, etc.) typically comprise a hermetically sealed container and a feedthrough assembly having one or more feedthrough terminals (e.g., niobium pins) that provide conductive paths from the interior of the container (e.g., from an anode lead embedded in an internal anode) to one or more lead wires exterior to the device. In the case of a cardiac pacemaker, these lead wires conduct pacing pulses to cardiac tissue and/or detect cardiac rhythms. In general, such feedthrough assemblies comprise a ferrule that secures the assembly relative to the container and an insulating structure (e.g., a glass or ceramic body) that insulates the terminal pin or pins from the ferrule. The feedthrough assembly may be hermetically sealed to prevent body fluids from seeping into the device.

To reduce the effects of stray electromagnetic interference (EMI) signals that may be collected by lead wires coupled to the feedthrough terminal pins, it is known to attach a discoidal capacitor to a feedthrough assembly (a discrete discoidal capacitor for a unipolar feedthrough assembly or a monolithic discoidal capacitor for a multipolar feedthrough assembly). The attached capacitor serves as an EMI filter that permits passage of relatively low frequency electrical signals along the terminal pins while shunting undesired high frequency interference signals to the container. Typically, the attachment of such a capacitor includes the thermal curing of one or more non-conductive epoxy preforms to physically couple the capacitor to a feedthrough assembly. To begin the attachment process, a ring-shaped epoxy preform is threaded over each terminal pin and positioned within a cavity provided along an exterior surface of the feedthrough assembly's ferrule. Next, the capacitor is slipped over the terminal pins and partially inserted into the ferrule's cavity such that the epoxy preforms are sandwiched between the underside of the capacitor and an upper surface of the ferrule. The feedthrough assembly is then placed within a curing oven and heated to a predetermined temperature (e.g., approximately 175 degrees Celsius) to melt the preforms and thereby secure the capacitor in relation to feedthrough assembly and the terminal pins. The feedthrough assembly is then withdrawn from the oven and a conductive material (e.g., epoxy, polyimide, solder, etc.) is dispensed into annular cavities provided between the terminal pins and the terminal pin apertures to electrically couple the feedthrough terminal pins to the inner electrode plates. The entire device may then be centrifuged to remove any voids present in the conductive material, and a second curing step may be performed. Lastly, a non-conductive top coat (e.g., epoxy, polyimide, etc.) may be applied to the upper surface of the capacitor to decrease the likelihood of high-voltage breakdown.

Although feedthrough filter capacitor assemblies of the type described above perform satisfactorily, the installation of such filter capacitor assemblies is relatively complex and time-consuming. For example, if satisfactory seals between the feedthrough pins and the interior annular surfaces of the ferrule are not formed during the thermal curing of the epoxy preforms, the conductive material may travel during centrifuging. Additionally, if the capacitors move in relation to the pins during the curing of the epoxy preforms, a loss of concentricity between the capacitor and the pins may result. Furthermore, the non-conductive epoxy preforms may wick into the annular cavities during curing and thus possibly interfere with the electrical interaction between the terminal pins and the inner electrode plates.

Considering the above, it should be appreciated that it would be desirable to provide a filtered feedthrough assembly utilizing an improved capacitor attachment technique. Additionally, it should be appreciated that it would be desirable to provide a more efficient method of manufacturing filtered feedthrough assemblies that produces reliable, high quality electrical connections. Furthermore, other desirable features and characteristics of the present invention will become apparent from the subsequent detailed description of the invention and the appended claims, taken in conjunction with the accompanying drawings and this background of the invention.

SUMMARY OF THE INVENTION

A method for coupling a capacitor to a feedthrough assembly that includes a ferrule and a terminal pin therethrough is provided. The method comprises dispensing an epoxy onto an outer surface of the feedthrough assembly. A capacitor, which has an opening therethrough for receiving the terminal pin and cooperates therewith to form a cavity, is placed over the ferrule to contact the epoxy. A weight is placed on the capacitor to position it in relation to the terminal pin, and the epoxy is cured.

A filtered feedthrough assembly for guiding a terminal pin through a housing of a medical device is also provided. The feedthrough assembly comprises a ferrule assembly fixedly coupled to the housing for guiding the terminal pin through the housing and electrically isolating the terminal pin therefrom. A capacitor is fixedly coupled to the ferrule assembly and has an aperture therethrough for receiving the terminal pin, which cooperates with the terminal pin to form an annular cavity. A layer of UV-curable, non-conductive epoxy is disposed between the ferrule assembly and the capacitor to secure the capacitor to the ferrule assembly. A conductive material is disposed within the annular cavity to electrically couple the terminal pin and the capacitor.

BRIEF DESCRIPTION OF THE DRAWINGS

The following drawings are illustrative of particular embodiments of the invention and therefore do not limit the scope of the invention, but are presented to assist in providing a proper understanding. The drawings are not to scale (unless so stated) and are intended for use in conjunction with the explanations in the following detailed descriptions. The present invention will hereinafter be described in conjunction with the appended drawings, wherein like reference numerals denote like elements, and.

DETAILED DESCRIPTION OF THE EXEMPLARY EMBODIMENT

The following description is exemplary in nature and is not intended to limit the scope, applicability, or configuration of the invention in any way. Rather, the following description provides a convenient illustration for implementing an exemplary embodiment of the invention. Various changes to the described embodiment may be made in the function and arrangement of the elements described herein without departing from the scope of the invention.

Figure 1:
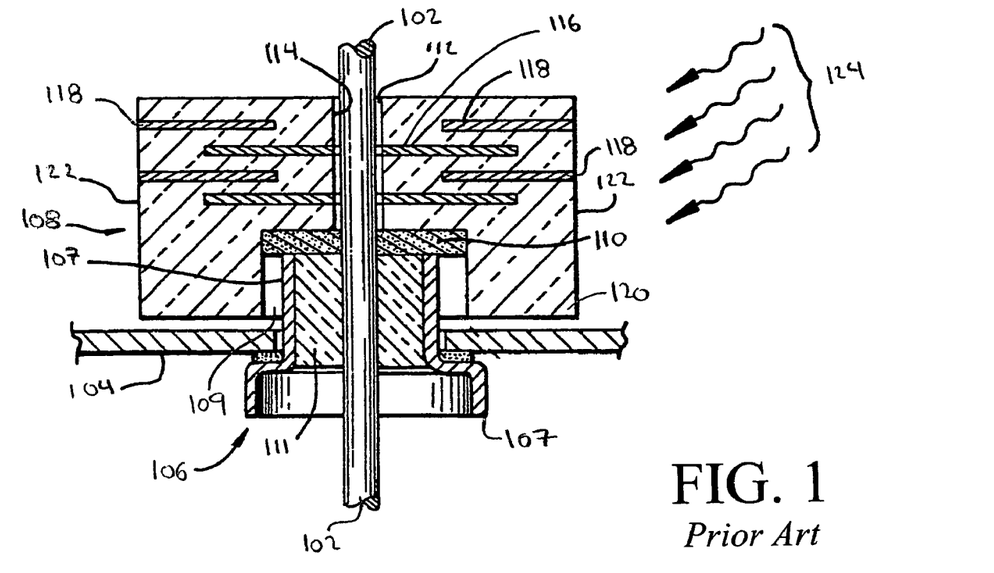
FIGS. 1 and 2 are cross-sectional views of a known feedthrough assembly before and after capacitor attachment, respectively.
Figure 2:
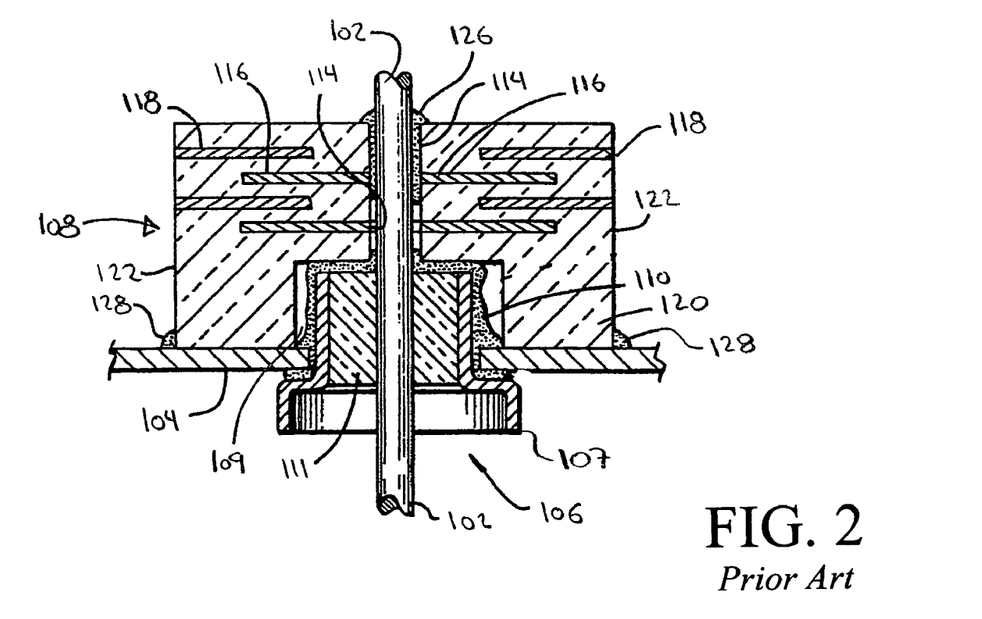
Figure 3:
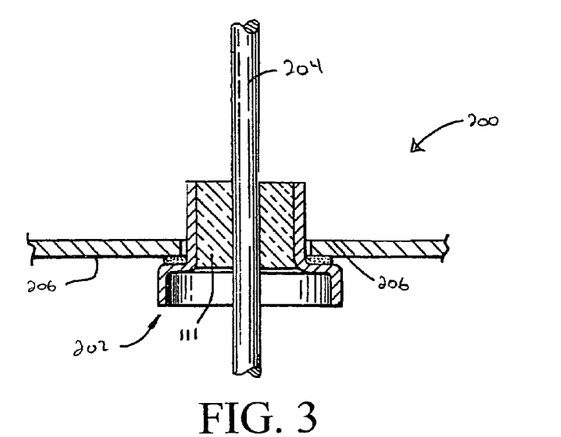
FIGS. 3-7 are cross-sectional views illustrating a technique for attaching a capacitor to a unipolar feedthrough assembly in accordance with a first embodiment of the present invention.

FIGS. 1 and 2 are cross-sectional views of a feedthrough assembly 100 before and after capacitor attachment, respectively. Feedthrough assembly 100 secures and electrically isolates an electrically conductive terminal pin 102 (e.g., niobium) with respect to a container 104 (only partially shown in FIGS. 1 and 2) of a medical device (e.g., a cardiac pacemaker, a cochlear implant, a neurostimulator, etc.). In particular, an inverted ferrule 106, which is fixedly coupled (e.g., welded) to container 104, guides pin 102 through container 104. Ferrule 106 comprises a conductive housing 107 (e.g., titanium alloy) and an insulator ring 111 (e.g., ceramic-based material) that electrically isolates terminal pin 102 from ferrule 106 and, thus, from container 104. Terminal pin 102 provides a conductive path from the interior of container 104 (e.g., from an anode lead embedded in an internal anode) to one or more lead wires exterior to the medical device, which are known to act as antennas that collect stray electromagnetic interference (EMI) signals. To suppresses and/or decouple such EMI signals to container 104, a discrete discoidal capacitor 108 is disposed around terminal pin 102 and attached to ferrule 106 and container 104 by thermally curing a ring-shaped epoxy preform 110 as described below. A terminal pin aperture 112, which is defined by an inner annular surface 114, is provided through capacitor 108 and receives terminal pin 102. As can be seen in FIGS. 1 and 2, the inner diameter of aperture 112 is larger than the outer diameter of terminal pin 102; thus, an annular cavity is formed between the outer surface of terminal pin 102 and inner surface 114 when capacitor 108 is threaded over pin 102.

Capacitor 108 further comprises a generally cylindrical cavity 109 in a bottom portion thereof, which is configured to receive an upper portion of ferrule 106 when capacitor 108 is attached to container 104. Additionally, capacitor 108 comprises a first set of inner electrode plates 116 and a second set of outer electrode plates 118 that are each embedded within an insulative or dielectric base structure 120. Inner electrode plates 116 and outer electrode plates 118 may be disposed within base structure 120 in a stacked configuration, though it will be appreciated that other known configurations may be utilized. The inner peripheral edges of inner electrode plates 116 extend radially inward to inner annular surface 114 and are thus exposed along terminal pin aperture 112. Similarly, outer peripheral edges of outer electrode plates 118 extend radially outward to an outer surface 122 of capacitor 108. A metallic film (e.g., metalized, silverized, plated, etc.) coats inner annular surface 114 and outer surface 122 and electrically couples inner electrode plates 116 and outer electrode plates 118, respectively, in the well-known manner. Thus, the electrical coupling of terminal pin 102 with inner annular surface 114 will result in the electrical coupling of pin 102 with inner electrode plate 116. Similarly, the electrical coupling of container 104 with outer surface 122 will result in the electrical coupling of container 104 with outer electrode plates 118.

Capacitor 108 is attached to ferrule 106 and container 104 by thermally curing epoxy preform 110 in the following manner. First, epoxy preform 110, which is ring-like in shape, is threaded over terminal pin 102 and positioned so as to abut an upper portion of ferrule 106. Capacitor 108 is then threaded over terminal pin 102 and positioned to abut epoxy preform 110 with an upper portion of ferrule 106 being received within cavity 109. Epoxy preform 110 is thus sandwiched between a lower surface of capacitor 108 and an upper surface of ferrule 106 within cavity 109. Next, feedthrough assembly 100 is placed within a curing oven and heated to a predetermined temperature (e.g., approximately 175 degrees Celsius) as indicated in FIG. 1 by arrows 124. As shown in FIG. 2, this causes epoxy preform 110 to melt and disperse along ferrule 106 and a portion of container 104. As preform 110 melts, capacitor 108 moves downward to abut container 104. Assembly 100 is then removed from the curing oven, and epoxy preform 110 is allowed to cool and harden thereby attaching capacitor 108 to ferrule 106 and, consequently, container 104. Afterwards, a conductive material (e.g., epoxy, polyimide, solder, etc.) 126 is dispensed into the annular cavity provided between pin 102 and interior annular surface 114 of capacitor 108 to electrically couple pin 102 to inner electrode plates 114. A second thermal curing step is then performed to cure the conductive material. Lastly, an adhesive fillet 128 may be disposed around the outer periphery of capacitor 108 proximate container 104 to further secure and electrically couple outer electrode plates 118 to container 104. After installation, capacitor 108 will function to permit passage of relatively low frequency electrical signals along terminal pin 102 while shunting undesired high frequency interference signals to conductive container 104 in the well-known manner.

As explained above, conventional capacitor attachment methods, including that just described, may encounter certain difficulties during the thermal curing of epoxy preforms. For example, conventional attachment methods are relatively time consuming and may produce less than ideal bonds and electrical connections. As will be seen, the inventive feedthrough assembly and production method mitigate these problems by utilizing a non-conductive epoxy that is curable by ultra violet (UV) light to attach the capacitor to the container of the medical device and/or one or more weighted bodies to maintain the proper positioning of the feedthrough pins within the feedthrough pin apertures during curing. Though the inventive attachment method may be utilized to couple a monolithic capacitor to a multipolar feedthrough assembly, the method will be first described in conjunction with the attachment of a discrete discoidal capacitor and a unipolar feedthrough assembly similar to that previously described.

Figure 4:
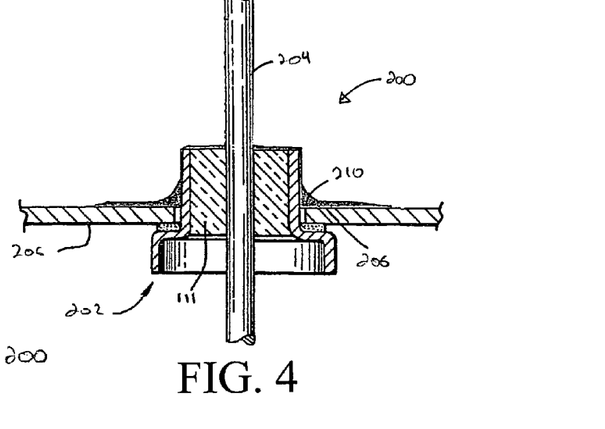
Figure 5:
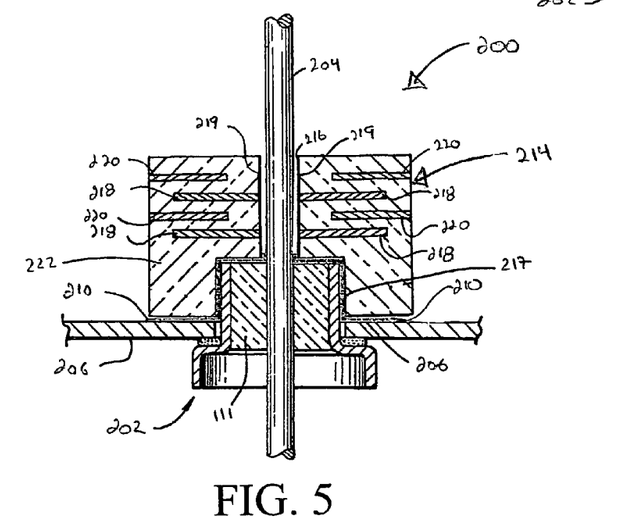

FIGS. 3-7 are cross-sectional views illustrating a technique for attaching a capacitor to a unipolar feedthrough assembly in accordance with a first embodiment of the present invention. Beginning with FIG. 3, there is shown an inverted feedthrough assembly 200 prior to attachment of a discrete discoidal capacitor. Feedthrough assembly 200 is similar to assembly 100 described above in conjunction with FIGS. 1-2 and includes an inverted ferrule 202 that secures and electrically isolates an electrically conductive terminal pin 204 (e.g., niobium) with respect to a container 206 of a medical device. As shown in FIG. 4, feedthrough assembly 100 is prepared for capacitor attachment by first applying a non-conductive epoxy 210 curable by UV light to the surface of ferrule 202 and, perhaps, to the surface of container 206. UV-curable epoxies are common, and it will be appreciated that a wide variety of epoxies may be utilized. After application of UV-curable epoxy 210 (FIG. 4), a discrete discoidal capacitor 214 is threaded over terminal pin 204 and placed into contact with epoxy 210 as shown in FIG. 5. Capacitor 214 is provided with a cavity 217 through a bottom region thereof that receives an upper portion of ferrule 202. Additionally, capacitor 214 is provided with a terminal pin aperture 216 that is defined by an inner annular surface of ferrule 202 and that extends through capacitor 214 from an upper surface of capacitor 214 to cavity 217. As shown in FIG. 5, terminal pin aperture 216 is configured to receive terminal pin 204. The inner diameter of aperture 216 is larger than the outer diameter of terminal pin 204 and an annular cavity is formed there between. Capacitor 214 is further provided with a first set of inner electrode plates 218 and a second set of outer electrode plate 220 that are embedded in a stacked formation within an insulative or dielectric base structure 222. As was the case previously, the inner peripheral edges of inner electrode plates 218 extend radially inward to inner annular surface 219, and the outer peripheral edges of outer electrode plates 220 extend radially outward to an outer surface of capacitor 214. A metallic film coats annular surface 219 to electrically couple plates 218. A metallic film also coats the outer surface of capacitor 214 to electrically couples plates 220.

Figure 6:
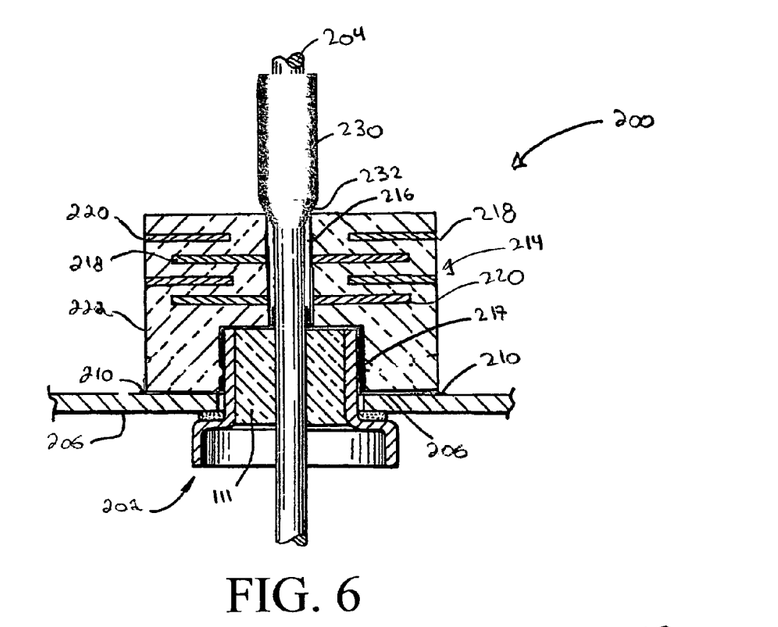

After capacitor 214 has been threaded over terminal pin 204 and positioned with respect to ferrule 202, at least one weight 230 (FIG. 6) having a longitudinal aperture therethrough is threaded over terminal pin 204 and placed in an abutting relationship with an upper surface of capacitor 214. Weight 230 forces capacitor 214 downward toward ferrule 202 and further disperses epoxy 210. Importantly, the inner diameter of the aperture provided through weight 230 is closely tailored to the outer diameter of terminal pin 204; thus, weight 230 may slide longitudinally along pin 204 but may not move laterally with respect thereto. Weight 230 includes an end region 232 that is configured to partially enter terminal pin aperture 216. In this way, weight 230 functions to position terminal pin 204 relative to capacitor 214 during the UV curing process described below. Preferably, end region 232 comprises a tapered end portion (e.g., a frustoconical end portion as shown in FIG. 6) that may wedge into terminal pin aperture 232 and other apertures of various shapes and sizes. By positioning terminal pin 204 in relation to capacitor 108, and thus in relation to pin receiving aperture 112, weight 230 prevents movement of capacitor 108 and thus maintains the concentricity between capacitor 214 and terminal pin 204.

Figure 7:
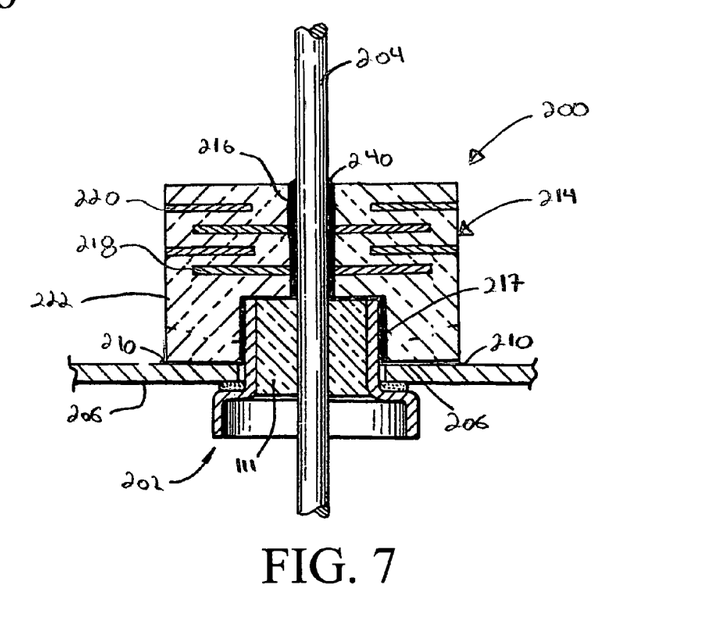

After capacitor 214 is positioned relative to terminal pin 204 by weight 230, epoxy 210 is cured by exposure to ultra-violet light. This may be accomplished by, for example, exposing assembly 200 to an ultra-violet light source having a wavelength of approximately 200-300 nanometers for approximately 30-40 seconds. This will cause the exposed portions of epoxy 210 (e.g., the regions of epoxy 210 exposed along the outer periphery of the capacitor/container junction) to undergo a cross-linking process, harden, and consequently physically couple capacitor 214 to ferrule 202 and container 206. The UV-curing process will also affect neighboring portions of epoxy 210 that are not directly exposed to the UV light. Therefore, UV-epoxy 210 may be suitably cured by treating only the exposed areas thereof. This notwithstanding, the UV exposure of epoxy 210 may be increased by providing weight 230 with one or more grooves or apertures through end region 232. Additionally, if desired, assembly 200 may be placed within a curing oven and heated to further cure epoxy 210. For example, after ultraviolet curing, assembly 200 may be heated to approximately 135 degrees Celsius for approximately 30 minutes. Whether or not a thermal curing step is performed, it should be appreciated that the inventive capacitor attachment method is significantly quicker than conventional capacitor attachment methods, which may require over two hours to complete. Additionally, it should be appreciated that the inventive capacitor attachment method results in the formation of relatively strong and complete seals, which prevent the wicking of the epoxy into the annular cavities. To complete the attachment of capacitor 214 to ferrule 202, a conductive material (e.g., epoxy, polyimide, solder, etc.) 240 is dispensed into terminal pin aperture 216 to electrically couple pin 204 to inner electrode plates 218 as shown in FIG. 7. The entire device may then be centrifuged to remove any voids present in conductive material 240, and a second curing step may be performed.

Figure 8:
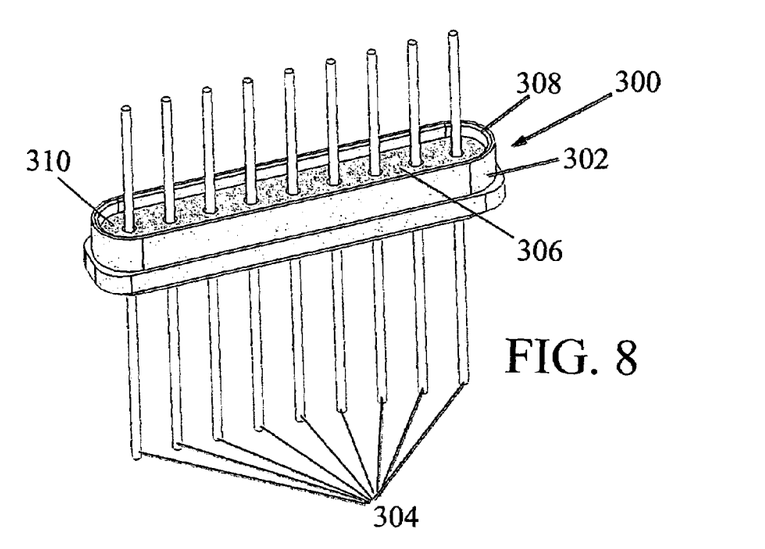
FIGS. 8 and 9 are isometric and cross-sectional isometric views, respectively, of a multipolar feedthrough assembly in accordance with a second embodiment of the present invention.
Figure 9:
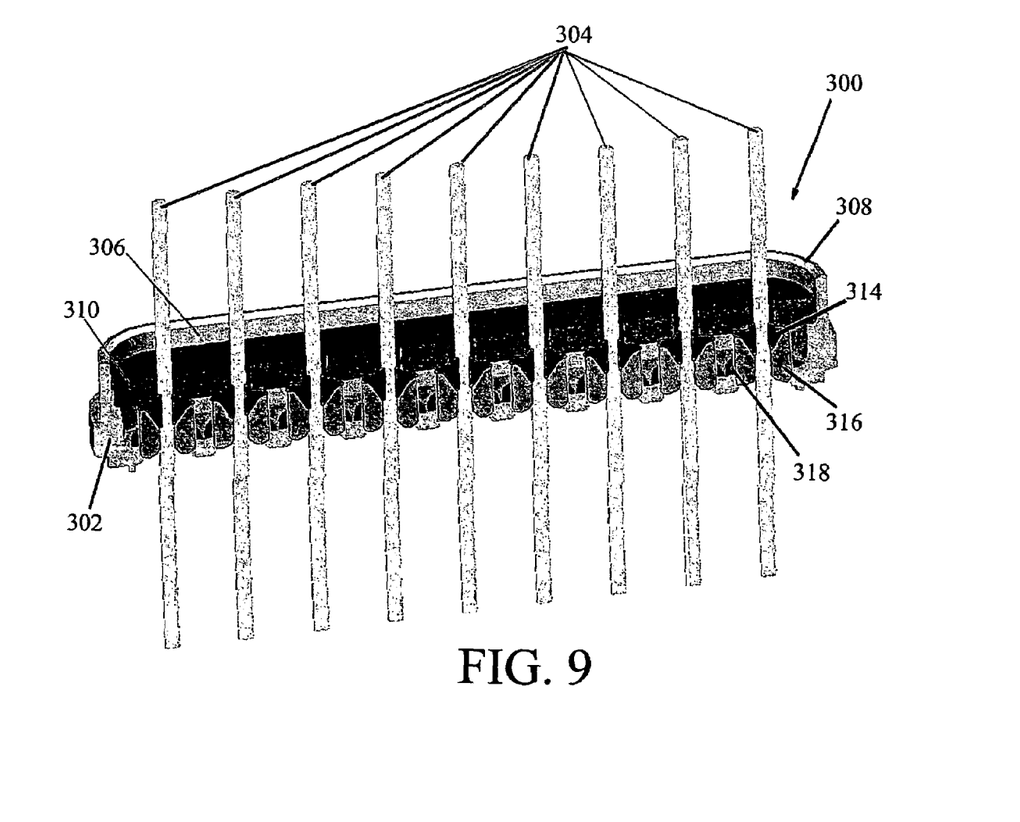

FIGS. 8 and 9 are isometric and isometric cross-sectional views, respectively, of a multipolar feedthrough assembly 300 comprising a plurality (e.g., nine) of feedthrough pins 304 that pass through a ferrule 302 fixedly coupled (e.g., welded) to a medical device (not shown). A cavity 306 is provided through ferrule 302. Cavity 306 is defined by lip 308 provided around the upper portion of ferrule 302 and a support structure 310 (e.g., polyimide) is disposed within ferrule 302, which is commonly referred to as a racetrack. As may most easily be appreciated by referring to FIG. 9, a plurality of braze joints is provided within ferrule 302 below structure 310, each of which is associated with a different one of feedthrough pins 304. Each braze joint comprises a pin-insulator braze 314 (e.g., gold), an insulator ring 316 (e.g., glass, ceramic, etc.), and an insulator-ferrule braze 318 (e.g., gold) and function in the well-known manner. For simplification purposes, structure 310 may be considered part of ferrule 302.

Figure 10:
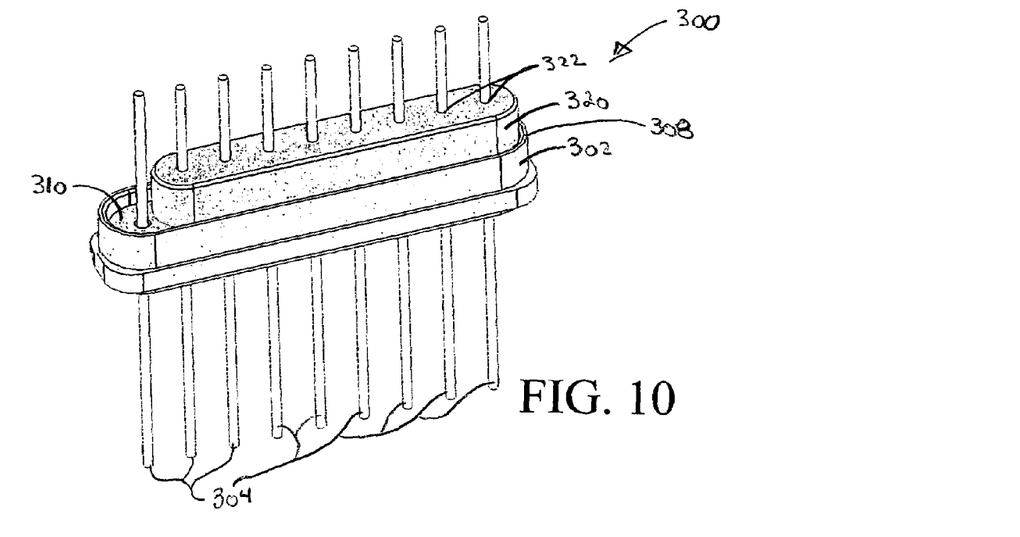
FIG. 10 is an isometric view of the feedthrough assembly shown in FIGS. 8 and 9 having a capacitor positioned for attachment thereto.

To prepare feedthrough assembly 300 for capacitor attachment, a non-conductive, UV-curable epoxy (not shown) is dispensed within cavity 306 over the surfaces of ferrule 302 and structure 310 that may be contacted by a monolithic capacitor. Preferably, the UV-curable epoxy is disposed along structure 310 proximate each of feedthrough pins 364. After the UV-curable epoxy has been dispensed, a monolithic capacitor 320 is threaded over feedthrough pins 304 and placed in an abuttingly relationship with ferrule 302 as shown in FIG. 10. Capacitor 320 may include eight terminal pin apertures 322 therethrough, which receive eight of terminal pins 304. The ninth one of terminal pins 304 may serve as an RF antenna and thus may be left unfiltered.

Figure 11:
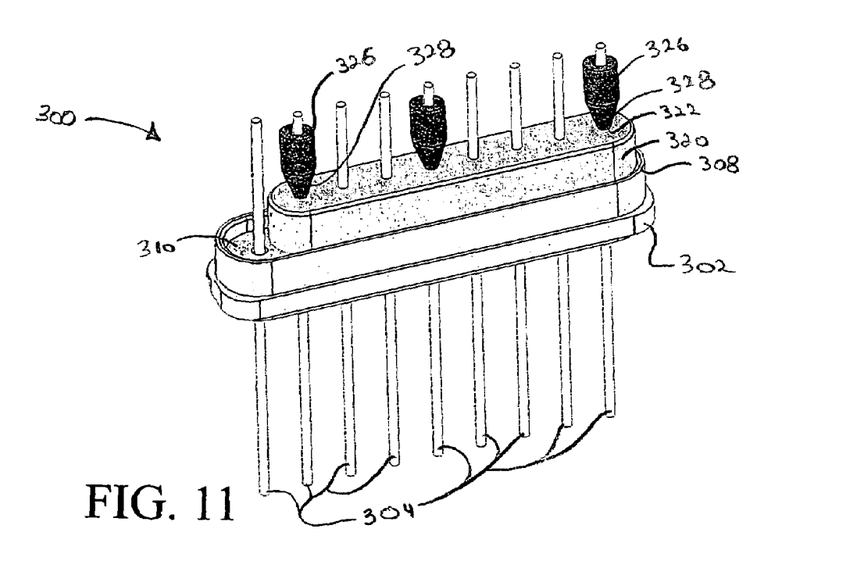
FIG. 11 is an isometric view of the capacitor shown in FIG. 10 secured by a plurality of weights in relation to the feedthrough assembly shown in FIGS. 8-10 in accordance with the second embodiment of the present invention.

After being properly positioned relative to ferrule 302 and feedthrough pins 304, capacitor 320 may be positioned by application of plurality of weights 326, three of which are shown in FIG. 11. As was previously the case with weight 230

(FIG. 6), weights 326 each include an aperture therethrough having inner diameter only slightly larger than the outer diameters of feedthrough terminal pins 326; thus, the movement of weights 326 is substantially confined to movement along the longitudinal axes of terminal pins 326. As was also the case previously, weights 326 each include a tapered end region 328 that is configured to partially enter respective ones of terminal pin apertures 322 and thereby position terminal pins 304 relative to capacitor 320 during the UV curing process. Though weights 326 are each shown to have a substantially cylindrical body and end regions 328 are each shown to have a truncated lanceolate geometry, it should be appreciated that the weight or weights utilized to position capacitor 320 relative to terminal pins 304 may assume a wide variety of forms. For example, a unitary weighted body may instead be utilized as described in the following paragraph, which has multiple terminal pin apertures therethrough and a lower region conforming to an upper portion of capacitor 320 and/or ferrule 302.

Figure 12:
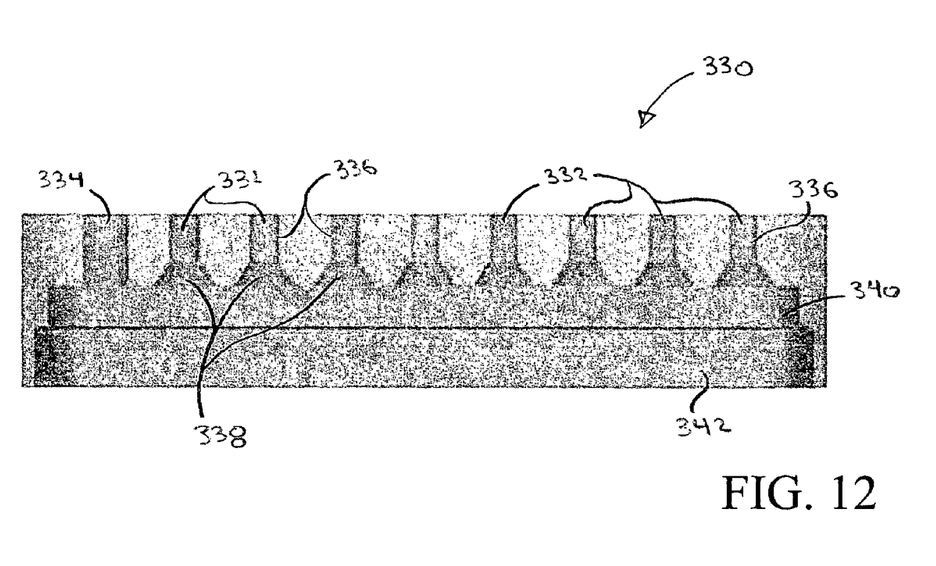
FIG. 12 is an isometric view of a weighted body suited for maintaining the position of the capacitor shown in FIG. 10 relative to the feedthrough assembly shown in FIGS. 8-10 in accordance with a third embodiment of the present invention.

FIG. 12 provides a cross-sectional view of a weighted body 330 that may be used to position capacitor 320 relative to terminal pins 304 during the UV curing process. As can be seen, weighted body 330 includes a plurality (e.g., eight) of filtered terminal pin apertures 332 therethrough, and one non-filtered terminal pin aperture 334 therethrough. As may be appreciated by comparing FIG. 12 to FIGS. 10 and 11, apertures 332 and aperture 334 each receive a different one of terminal pins 304. In particular, apertures 332 each receive a different one of the filtered terminal pins 304 that pass through capacitor 320, and aperture 334 receives the one unfiltered terminal pins 304 that does not pass through capacitor 320. Apertures 332 each comprise a tubular section 336 having an inner diameter that is closely tailored to the outer diameters of pins 304. If desired, apertures 332 may also each be provided with a conic section 338 to facilitate threading of weighted body 330 over pins 304. In contrast to apertures 332, aperture 334 may comprise a tubular bore having an inner diameter substantially larger than the inner diameters of tubular sections 336 or the outer diameters of terminal pins 304. Aperture 334 is permitted this geometry because it receives the unfiltered one of terminal pins 304, which does not pass through capacitor 320 and thus does not need to be secured in relation thereto. Weighted body 330 further comprises two inner regions: a first inner region 340 that is configured to receive the exposed upper portion of capacitor 320, and a second inner region 342 that is configured to receive an upper portion of ferrule 302. Still comparing FIG. 12 to FIGS. 10 and 11, it should be appreciated that the inner diameters of regions 340 and 342 are closely tailored to the outer diameter of the upper portions of capacitor 320 and ferrule 302, respectively. Thus, when disposed proximate feedthrough assembly 300, weighted body 330 will be matingly received by feedthrough terminal pins 304, capacitor 320 and ferrule 302. Consequently, when so disposed, weighted body 330 will maintain the appropriate spatial disposition of capacitor 320, ferrule 302, and feedthrough pins 304. In particular, weighted body 330 will maintain feedthrough pins 304 at their desired, centered positions through each of terminal pin apertures 322.

If a conformal weighted body such as weighted body 330 is utilized to position pins 304 relative to capacitor 330, it may be preferable to cure the UV-curable epoxy disposed between capacitor 320 and ferrule 302 thermally; as the conformal weighted body may substantially prevent UV light from reaching the UV-curable epoxy, UV curing may prove ineffective. This notwithstanding, it should be appreciated that, if the conformal body does not fully prevent UV light from reaching the epoxy (e.g., if one or more grooves or apertures are provided through the conformal weighted body), the UV-curable epoxy may be cured in part or entirely by UV curing. This UV curing may comprise, for example, exposing assembly 300 to ultra-violet light having a wavelength of approximately 200-300 nanometers for a relatively short period of time (e.g., approximately 30-40 seconds).

After the epoxy disposed between capacitor 320 and ferrule 302 has been suitably cured, weights 328 (or weighted body 330) are removed and a conductive material (e.g., epoxy, polyimide, solder, etc.) is dispensed into each of pin receiving apertures 322 to electrically couple feedthrough terminal pins 304 with capacitor 320 as described above. Assembly 300 may then be centrifuged to eliminate any voids present in the conductive material. As the inventive method produces relatively complete seals between the feedthrough pins and the annular interior surfaces of the ferrule, the conductive material will be prevented from traveling during centrifuging and thereby prevented from causing shortage during high voltage exposure. Lastly, a non-conductive top coat (e.g., UV-epoxy) may be dispensed onto the upper surface of capacitor 320 proximate feedthrough pins 304 and cured to prevent excess conductive material from electrically coupling terminal pins 304 and causing a high-voltage breakdown.

Figure 13:
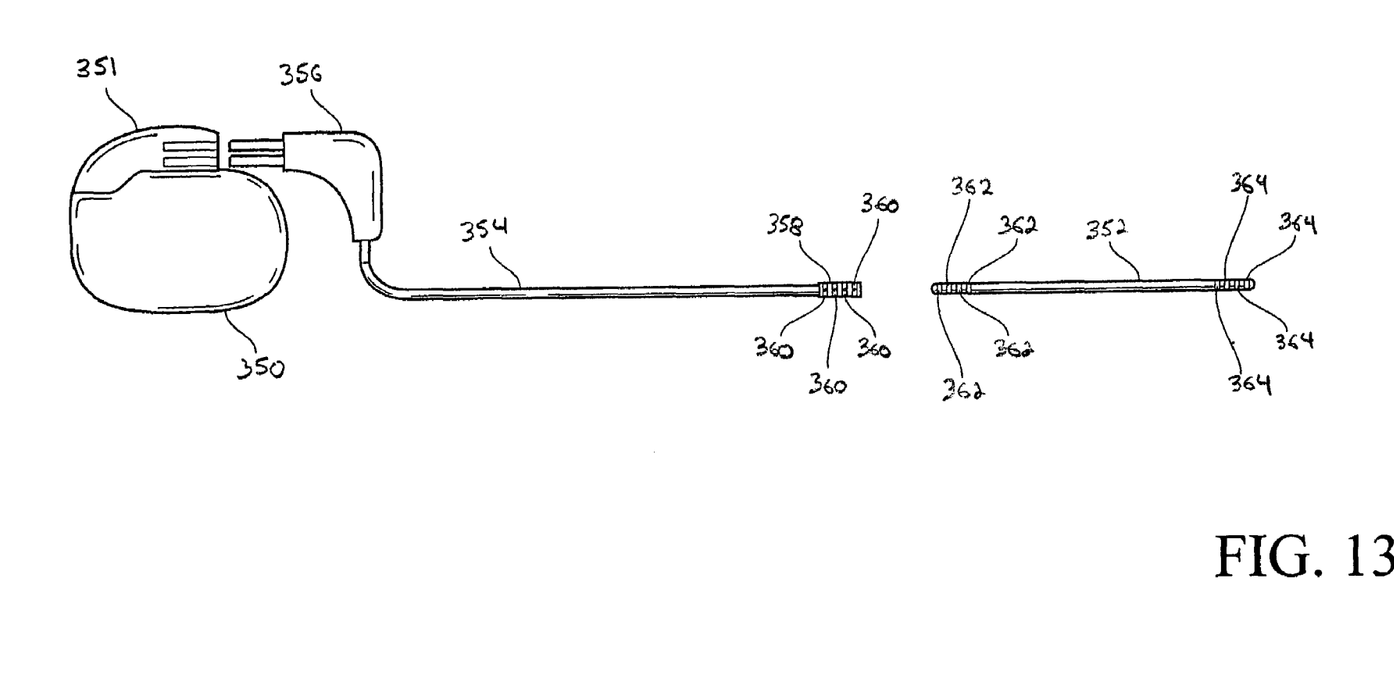
FIG. 13 is an exploded view of an implantable medical device.

FIG. 13 is an exploded view of an implantable medical device (e.g., a pulse generator) 350 coupled to a connector block 351 and a lead 352 by way of an extension 354. The proximal portion of extension 354 comprises a connector 356 configured to be received or plugged into connector block 351, and the distal end of extension 354 likewise comprises a connector 358 including internal electrical contacts 360 configured to receive the proximal end of lead 352 having electrical contacts 362 thereon. The distal end of lead 352 includes distal electrodes 364, which may deliver electrical pulses to target areas in a patient's body (or sense signals generated in the patient's body; e.g., cardiac signals)

Figure 14:
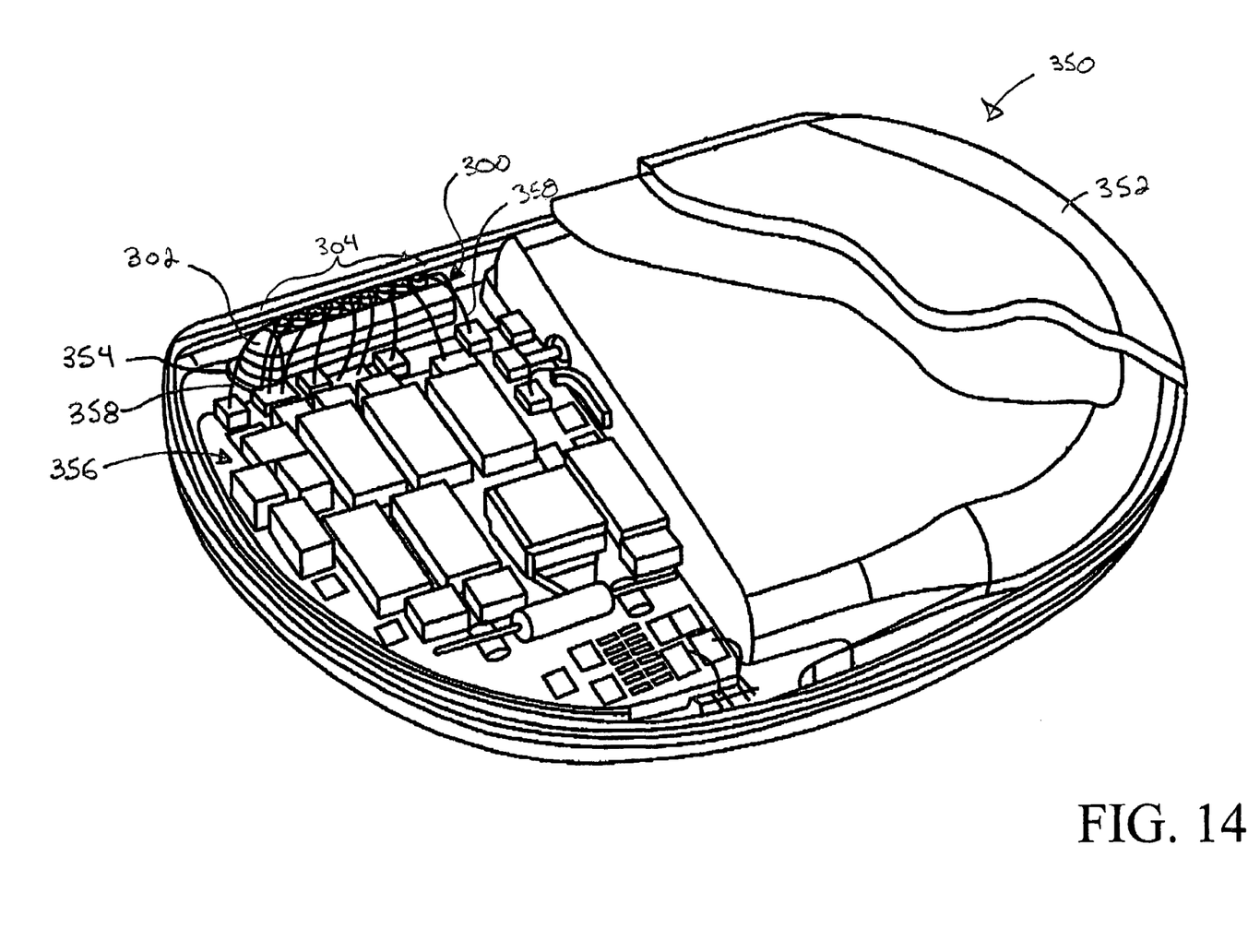
FIG. 14 is an isometric cutaway view of an implantable medical device incorporating the feedthrough assembly shown in FIGS. 8-11.

After a capacitor 320 has been attached to feedthrough assembly 300 in the manner described above, assembly 300 may be welded to the housing of an implantable medical device 350 as shown in FIG. 14. Medical device 350 comprises a container 352 (e.g. titanium or other biocompatible material) having an aperture 354 therein through which feedthrough assembly 300 is disposed. As can be seen, each terminal pin in plurality 304 has been trimmed and is electrically connected to circuitry 356 of device 350 via a plurality of connective wires 358 (e.g., gold), which may be coupled to terminal pins 304 by wire bonding, laser ribbon bonding, or the like. After installation, feedthrough assembly 300 and capacitor 320 (FIGS. 9-11) collectively function to permit the transmission of relatively low frequency electrical signals along the terminal pins in plurality 304 to circuitry 356 while shunting undesired high frequency EMI signals to container 352 of device 350.

In view of the above, it should be appreciated that there has been provided a filtered feedthrough assembly utilizing a means of capacitor attachment that avoids the above-described problems. Additionally, it should be appreciated that there has been provided a method of capacitor attachment that is relatively quick and that produces reliable, high quality electrical connections. Although the invention has been described with reference to a specific embodiment in the foregoing specification, it should be appreciated that various modifications and changes can be made without departing from the scope of the invention as set forth in the appended claims. Accordingly, the specification and figures should be regarded as illustrative rather than restrictive, and all such modifications are intended to be included within the scope of the present invention.

The invention claimed is:

1. A method for coupling a capacitor to a feedthrough assembly that includes a ferrule and a terminal pin therethrough, the method comprising:
dispensing an epoxy onto an outer surface of the feedthrough assembly;
placing a capacitor over the ferrule to contact the epoxy, the capacitor having an opening therethrough for receiving the terminal pin and cooperating therewith to form a cavity, the opening defining a terminal pin aperture;
deploying a weight on the capacitor by threading the terminal pin through a longitudinal aperture of the weight and wedging a tapered end portion of the weight into the terminal pin aperture; and
curing the epoxy.

2. A method according to claim 1 wherein the epoxy comprises an epoxy preform, and wherein the step of curing comprises thermally curing the epoxy preform.

3. A method according to claim 1 wherein the epoxy comprises a UV-curable epoxy, and wherein the step of curing comprises exposing at least a portion of the UV-curable epoxy to ultra-violet light.

4. A method according to claim 3 further comprising thermally curing the UV-curable epoxy.

5. A method according to claim 1 wherein the feedthrough assembly comprises at least first and second terminal pins through the ferrule, wherein a weight is threaded ever each of the at least first and second terminal pins.

6. A method for attaching a capacitor having a terminal pin aperture therethrough to a feedthrough assembly of an implantable medical device, the feedthrough assembly including a terminal pin therethrough received by the aperture, the method comprising:
dispensing a UV-curable epoxy onto an exterior surface of the feedthrough assembly;
placing the capacitor in an abutting relationship with the exterior surface, the terminal pin aperture cooperating with the terminal pin to form an annular cavity there between;
threading the terminal pin through a weighted body having a longitudinal aperture therethrough and a tapered end and positioning the weighted body against the capacitor an into the terminal pin aperture to maintain the position of the terminal pin within the aperture; and
curing the epoxy with ultra-violet light.

7. A method according to claim 6 wherein the feedthrough assembly includes a plurality of feedthrough pins and said weighted body has a plurality of channels therethrough each for receiving a different one of the plurality of feedthrough pins.

8. A method according to claim 6 further comprising thermally curing the UV-curable epoxy.

9. A method according to claim 6 wherein the step of curing includes directing the ultra-violet light into the annular cavity.

10. A method according to claim 6 wherein the step of curing comprises exposing a portion of the epoxy to ultra-violet light having a wavelength of approximately 200-300 nanometers.

* * * * *